Feb. 6, 1968   A. O. JANSSON   3,366,998
MOLDING FASTENER
Filed June 23, 1966

Inventor:
Arnold O. Jansson,
by James R O'Connor Atty.

United States Patent Office 3,366,998
Patented Feb. 6, 1968

3,366,998
MOLDING FASTENER
Arnold O. Jansson, Troy, Mich., assignor to United-Carr Incorporated, Boston, Mass., a corporation of Delaware
Filed June 23, 1966, Ser. No. 559,919
3 Claims. (Cl. 24—73)

ABSTRACT OF THE DISCLOSURE

A molding fastener. A cross plate adapted to be inserted between the inturned flanges of a molding and rotated into recesses formed by the flanges has a resilient molding engaging stand off adapted to engage the inner surface of the molding to bias the cross plate against the flanges. The stand off extends generally normally from the cross plate and is compressible in the direction of its longitudinal axis thereby decreasing its over-all length. The stand off is also deflectable in any lateral direction from its normal attitude with respect to the cross plate.

---

This invention relates generally to fasteners and more particularly to fasteners for securing decorative moldings and the like as exemplified by the fasteners disclosed in U.S. Patents 2,709,286; 2,695, 434 (W. A. Bedford, Jr.) and 2,531,351; 2,531,352 (W. H. Churchill).

The fasteners disclosed in the Bedford patents are generally known as the "side wing" type of molding fastener and have proved highly successful from a commercial standpoint in that a single size fastener is adapted to engage a wide range of moldings having diverse widths across their inturned flanges, since the side wing will automatically urge the cross plate into a proper molding engaging attitude. Further, the Bedford type fasteners are best suited for use with low profile moldings wherein the edges of the cross plate seat in shallow recesses formed by the inturned flanges and the adjacent back portion of the molding. Since the plate edges are trapped in the recesses, it cannot tip or fall away from the flanges and the attaching bolt is maintained in a perpendicular attitude for proper alignment with the apertures in a supporting chassis to which the molding is to be secured. Conversely, when used with moldings having a relatively high profile such as those depicted in the drawings accompanying the present disclosure, the same fasteners tend to tip or fall away from the inturned molding flanges causing the bolt to adopt a skew attitude which is out of alignment with the apertures in the supporting chassis. In connection with the above, one will appreciate that in the mass production of automobiles and appliances wherein decorative moldings are prolifically used, the fasteners for securing a given length of molding are placed therein sometime prior to the actual installation on the chassis. Thus, when the time for assembly on the production line arrives it is highly desirable that all attaching bolts be properly aligned for ready passage through the preformed apertures in the chassis without the necessity for time consuming indiviual re-alignment.

The fasteners disclosed by Churchill are representative of previous attempts to provide a stand off or tensioning member which would ensure proper fastener alignment wherein higher profile moldings are utilized. One disadvantage of the fasteners disclosed in both Churchill patents is that the sheet metal tensioning arms have been known to ding the engaged portions of the moldings during installation causing small bumps in the surface thereof, particularly when the moldings are fabricated from relatively soft metals such as aluminum. Further, with regard to the fastener disclosed in Churchill 2,531,352, one will appreciate that it is hardly adaptable for use with a relatively narrow and relatively high molding in that the cross plate would not be long enough to allow for the shearing of tensioning arms therefrom which would reach the high back portions of the molding. In any case, to construct such a fastener would result in a substantial loss of metal attendant to its fabrication. Still another deficiency in the Churchill constructions is that the tensioning arms can only be flexed in the vertical direction with respect to the cross plate and not in a lateral direction as is true of the stand off disclosed herein. Thus, when a non-symmetrically shaped molding such as that appearing in FIG. 4 of the present drawing to be secured, the tensioning arms can only engage an angularly sloping surface and are likely to slip allowing the cross plate to tip or fall away from the inturned flanges.

Therefore, the present invention, which is adapted for use in each of the installations wherein the prior art devices discussed were formerly used and in many others where those devices proved deficient, is seen to represent a substantial improvement over the prior art.

In view of the foregoing remarks the principal object of the invention is to provide a molding fastener which is adapted to positively engage moldings having diverse widths across their inturned flanges and which is provided with a molding engaging stand off for positively engaging the back portion of relatively high profile moldings of many different cross sectional shapes to prevent the molding engaging cross plate from tipping away from the inturned molding flanges prior to the final installation on a supporting chassis.

Another object of the invention is to provide a molding fastener having a stand off attached to its cross plate which can be compressed towards the cross plate and flexed laterally in any direction from its normal free standing attitude with respect to the cross plate.

Another object of the invention is to provide a molding fastener embodying a molding engaging stand off which is formed of a synthetic resinous material.

Additional objects and advantages of the novel molding fastener will become evident from a reading of the following detailed description in conjunction with a viewing of the accompanying drawings in which.

Figure 1:
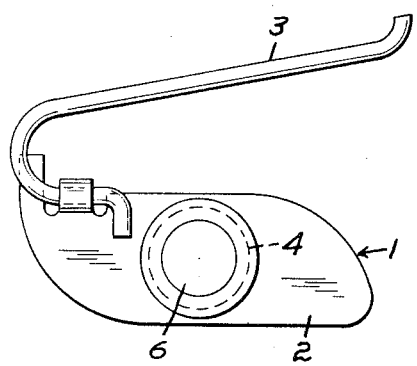
FIG. 1 is a top plan view of the fastener.
Figure 2:
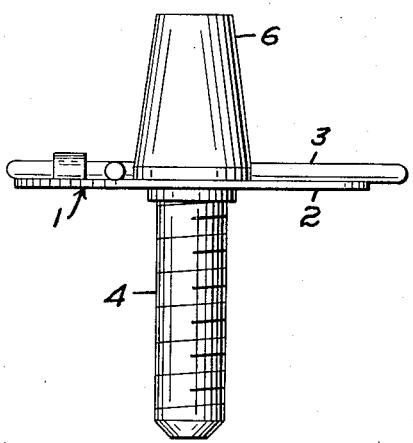
FIG. 2 is a side elevation of the fastener.

The basic structure of the fastener 1 is well known and is described in detail in the previously mentioned Bedford Patent No. 2,709,286. It includes a molding engaging cross plate 2, a "side wing" or wire spring arm 3 secured to the plate and having a free portion extending alongside the plate, which arm is adapted to rotatably urge the cross plate into a proper molding engaging attitude and a headed bolt 4 secured to the plate and having a shank extending generally perpendicular from one surface of the cross plate for securing the fastener and engaged molding to a supporting, apertured chassis by application of the nut 5 or some other co-operating fastener thereto.

The improvement which is the essence of the present invention is found in the molding engaging stand off 6 of generally frusto-conical shape and formed of a molded, synthetic, resinous material, for example, P.V.C. Plastisol, having its base bonded to the cross plate 2 and the head of the bolt 4.

Figure 3:
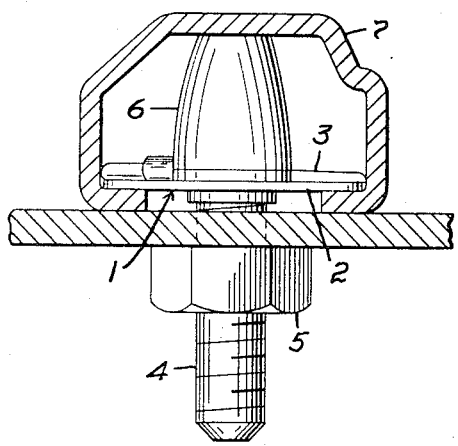
FIG. 3 is an end elevation of an installation depicting the fastener securing a molding having one cross sectional configuration to a supporting chassis with the molding and support shown in section.
Figure 4:
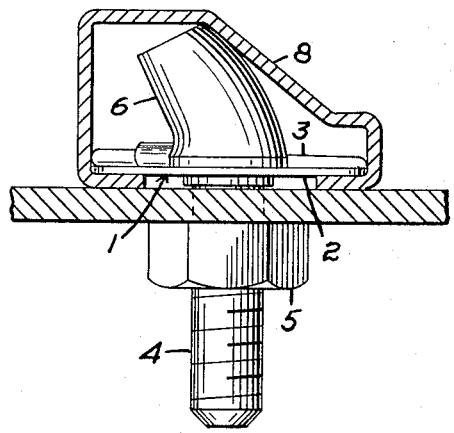
FIG. 4 is an end elevation of an installation similar to FIG. 3 wherein the molding has a radically different cross sectional shape.

The function of the stand off 6 becomes clearly evident from a consideration of FIGS. 3 and 4. In each of those illustrations one will observe that the moldings 7 and 8 have a relatively high profile and that the recesses formed by the inturned flanges and the sides and back portions of the moldings are quite deep. Thus, while the "side wing" 3 rotatably urges the cross plate 2 into a proper molding engaging attitude across the inturned flanges, in the absence of the stand off 6 there would be nothing to prevent the cross plate from falling away from at least one of the flanges thereby causing the bolt 4 to extend skewly from the molding. Since, as previously mentioned, the fasteners are positioned in the moldings prior to the attachment to a supporting chassis and, for example, five equally spaced fasteners might be used to secure a four-foot long section of molding, each of the bolts would have to be re-aligned to the perpendicular when the molding section was brought against the chassis for final assembly.

Obviously, the stand off can be made to a height sufficient to engage the back portion of a molding regardless of the over-all height of the molding. However, it should be noted that a given section of molding will often vary in height along the length thereof. The present fastener is particularly adapted for use with such a molding section in that the molded resinous stand off 6 can be compressed towards the cross plate 2 to some extent. Ergo, a single size fastener and stand off can be used at the designated positions along the length of the molding even though it may not be of equal height at each position.

FIG. 4 clearly illustrates the adaptability of the invention for use with a molding having a rather severely sloping back portion opposite the gap between its inturned flanges. Since the stand off 6 can be flexed in any lateral direction from its normal free standing position, it will automatically cant over to engage the opposed back portion and continue to exert sufficient pressure on the cross plate 2 to hold the latter against the inturned molding flanges. Further, the synthetic, resinous material is much less likely to slip on the metallic molding than a metallic stand off such as that shown in the previously discussed Churchill patents. Thus, the stand off readily performs the desired function irrespective of the geometric shape of the moldings' cross section.

While I have thus described in detail the structure and function of my novel molding fastener, it should be clearly understood that said description is to be interpreted in an illustrative rather than a limiting sense in that the scope of the invention is best defined by the following claims.

1. A fastening device for assembly with a strip of molding having inturned flanges along its side edges forming opposed recesses, said device comprising a cross plate having fastening means extending from one side thereof and said cross plate being adapted to be inserted between the inturned flanges and rotated so that portions thereof pass into said recesses, means for rotatably urging said cross plate into engagement with the molding in the opposed recesses, and a resilient molding engaging stand off on the other side of said plate and adapted to engage the internal surface of the molding opposite said cross plate when the cross plate is rotated into the recesses to bias said cross plate against the inturned flanges, said stand off being joined to said cross plate and extending generally normally therefrom and further being compressible towards said cross plate in the direction of the longitudinal axis of said stand off thereby decreasing the over-all length of the stand off and said stand off being flexible in any lateral direction from its normal standing attitude with respect to said cross plate.

2. A fastening device according to claim 1 wherein said stand off is formed of a synthetic resinous material.

3. A fastening device according to claim 1 wherein said stand off has a generally frusto-conical shape.

References Cited

UNITED STATES PATENTS

| | | | |
|---|---|---|---|
| 2,473,400 | 6/1949 | Waara | 52—718 X |
| 2,531,352 | 11/1950 | Churchill | 24—73 |
| 2,745,156 | 5/1956 | Bedford | 24—73 |
| 3,000,066 | 9/1961 | Cochran | 24—73 |
| 3,120,686 | 2/1964 | Pickering | 24—73 |

OTHELL M. SIMPSON, *Primary Examiner.*

WILLIAM FELDMAN, *Examiner.*

G. WEIDENFELD, *Assistant Examiner.*